United States Patent
Fukagawa et al.

[11] Patent Number: 6,086,103
[45] Date of Patent: Jul. 11, 2000

[54] PRESSURIZED-FUEL TANK INSTALLATION STRUCTURE IN MOTORCAR

[75] Inventors: Masami Fukagawa; Masayuki Sano; Shingo Nagamine; Hideya Miyashiro, all of Wako, Japan

[73] Assignee: Honda Giken Kogyo Kabushiki Kaisha, Tokyo, Japan

[21] Appl. No.: 08/853,350

[22] Filed: May 8, 1997

[30] Foreign Application Priority Data

May 9, 1996 [JP] Japan .................................. 8-114735

[51] Int. Cl.⁷ ........................................................ B60P 3/22
[52] U.S. Cl. ........................................... 280/830; 280/834
[58] Field of Search ..................................... 280/830, 834

[56] References Cited

U.S. PATENT DOCUMENTS

| | | | |
|---|---|---|---|
| 1,351,336 | 8/1920 | Love | 280/830 |
| 4,676,517 | 6/1987 | Tamura | 280/5 A |
| 5,364,128 | 11/1994 | Ide | 280/784 |
| 5,560,651 | 10/1996 | Kami et al. | 280/788 |
| 5,702,125 | 12/1997 | Nakajima et al. | 280/834 |
| 5,794,979 | 8/1998 | Kasuga et al. | 280/834 |

FOREIGN PATENT DOCUMENTS 62-139720   6/1987   Japan .

*Primary Examiner*—J. J. Swann
*Assistant Examiner*—Michael Coff
*Attorney, Agent, or Firm*—Armstrong, Westerman, Hattori, McLeland and Naughton

[57] ABSTRACT

A structure arranged under a floor panel for mounting a tank to be charged with a pressurized-fuel such as natural gas and liquefied petroleum gas in a motorcar of front engine —front drive type is provided. The pressurized-fuel tank installation structure in a motorcar includes a chassis frame formed in a frame-shape for surrounding and supporting the pressurized-fuel tank and attached to a lower surface of the car-body from underside of the floor panel, the pressurized-fuel tank being positioned in the frame-shape and fitted to the chassis frame integrally; a rear wheel suspension provided on the chassis frame; and a pipe arranged along a lower surface of the floor panel for connecting the pressurized-fuel tank and an internal combustion engine with each other.

6 Claims, 4 Drawing Sheets

PRESSURIZED-FUEL TANK INSTALLATION STRUCTURE IN MOTORCAR

BACKGROUND OF THE INVENTION

The present invention relates to a structure arranged under a floor panel for mounting a tank to be charged with a pressurized-fuel such as natural gas and liquefied petroleum gas in a motorcar of front engine—front drive type what is called a FF car.

In a conventional motorcar with a pressurized-fuel tank mounted, as shown in Japanese Laid-Open Patent Publication No. Sho 62-13972, the pressurized-fuel tank and a primary pressure reducing valve are arranged within a trunk room at a rear part of the car-body.

In the conventional motorcar, while the pressurized-fuel tank is arranged in a car-room, an internal combustion engine is arranged in an engine room in a front part of the car-body separated from the car-room, and a pipe having a front end connected to the internal combustion engine extends rearward along a lower surface of a floor panel, penetrates through the floor panel in the neighborhood of the trunk room and connects with the pressurized-fuel tank at the rear end. Therefore, the pipe has joint parts dispersed on inside and outside of the car, so that connecting works of the joints are troublesome, much man-our and time are required for leak inspection of the pipe and productive efficiency is low.

In addition, since a large-sized, pressure resisting pressurized-fuel tank is arranged in the trunk room, capacity of the trunk room becomes small. Further, since the heavy pressurized-fuel tank is installed at an upper part of the car-body, center of gravity of the car-body rises and it is difficult to improve operation stability.

SUMMARY OF THE INVENTION

The present invention aims to provide an improved pressurized-fuel tank installation structure in a motorcar which overcomes the aforementioned difficulties. According to the present invention, there is provided a pressurized-fuel tank installation structure in a motorcar having an internal combustion engine supplied a fuel stored in a pressurized-fuel tank for operation mounted in a front part of a car-body, comprising a chassis frame formed in a frame-shape for surrounding and supporting the pressurized-fuel tank and attached to a lower surface of the car-body from underside i.e, under, of a floor panel, the pressurized-fuel tank being positioned in the frame-shape and fitted to the chassis frame integrally; a rear wheel suspension provided on the chassis frame; and a pipe arranged along a lower surface of the floor panel for connecting the pressurized-fuel tank and the internal combustion engine with each other.

In the present invention, the internal combustion engine, the pressurized-fuel tank and the pipe connecting them with each other are arranged on outside of the car-room and as a result, a piping work of the fuel supply system and a pipe leakage inspection are simplified remarkably to improve productivity and can be performed easily and efficiently. In addition, it is possible to prevent the pipe leakage surely.

Since the large-sized pressurized-fuel tank is arranged under the floor panel rather than within a trunk room, there is no dead space due to a gap about the pressurized-fuel tank in the trunk room even if a part of the floor panel above the pressurized-fuel tank swells up into the trunk room, therefore space efficiency of the car-room, especially the trunk room, is high.

Further, since the pressurized-fuel tank which necessarily becomes heavy for improving pressure resistance is installed in a lower position, center of gravity of the car-body is lowered and steering stability is increased.

According to an aspect of the present invention wherein the pressurized-fuel tank is formed in a cylinder having hemispherical both ends and a longitudinal center line of the tank is directed in a direction of width of the motorcar, the pressurized-fuel tank which is apt to become heavy for maintaining the pressure resistance can be lightened and installed to the car-body compactly.

According to another aspect of the present invention wherein the floor panel has a hollow hollowed upward, i.e., an upwardly hollowed portion, adapted to receive an upper half of the cylindrical pressurized-fuel tank fitted to the chassis frame, in case of a passenger car, the pressurized-fuel tank can be installed not interfering with a rear seat and the trunk room is not narrowed except an innermost part which is inconvenient for taking out and in articles from the beginning.

According to further aspect of the present invention wherein a pressure reducing device and a pipe to be connected with the pressurized-fuel tank are fitted to the chassis frame integrally, various parts in the fuel supply system can be arranged intensively so that space efficiency, assembling work efficiency and reliability on leak prevention can be improved further.

According to still another aspect of the present invention wherein a pressure reducing device and a pipe to be connected with the pressurized-fuel tank are fitted to the chassis frame integrally, and the chassis frame is attached to the car-body through a buffer means such as a rubber mount, the pipe on the chassis frame can be connected with the internal combustion engine by means of a flexible pipe because pressure in the pipe system affixed to the chassis frame is reduced by the pressure reducing device, further the chassis frame connected to the rear wheel suspension, the pipe system on the chassis frame and the pressurized-fuel tank can be floated from the car-body to get a improved ride.

DETAILED DESCRIPTION OF THE PREFERRED EMBODIMENT

Hereinafter, a preferred embodiment of the present invention shown in FIGS. 1 to 4 will be described.

Figure 1:
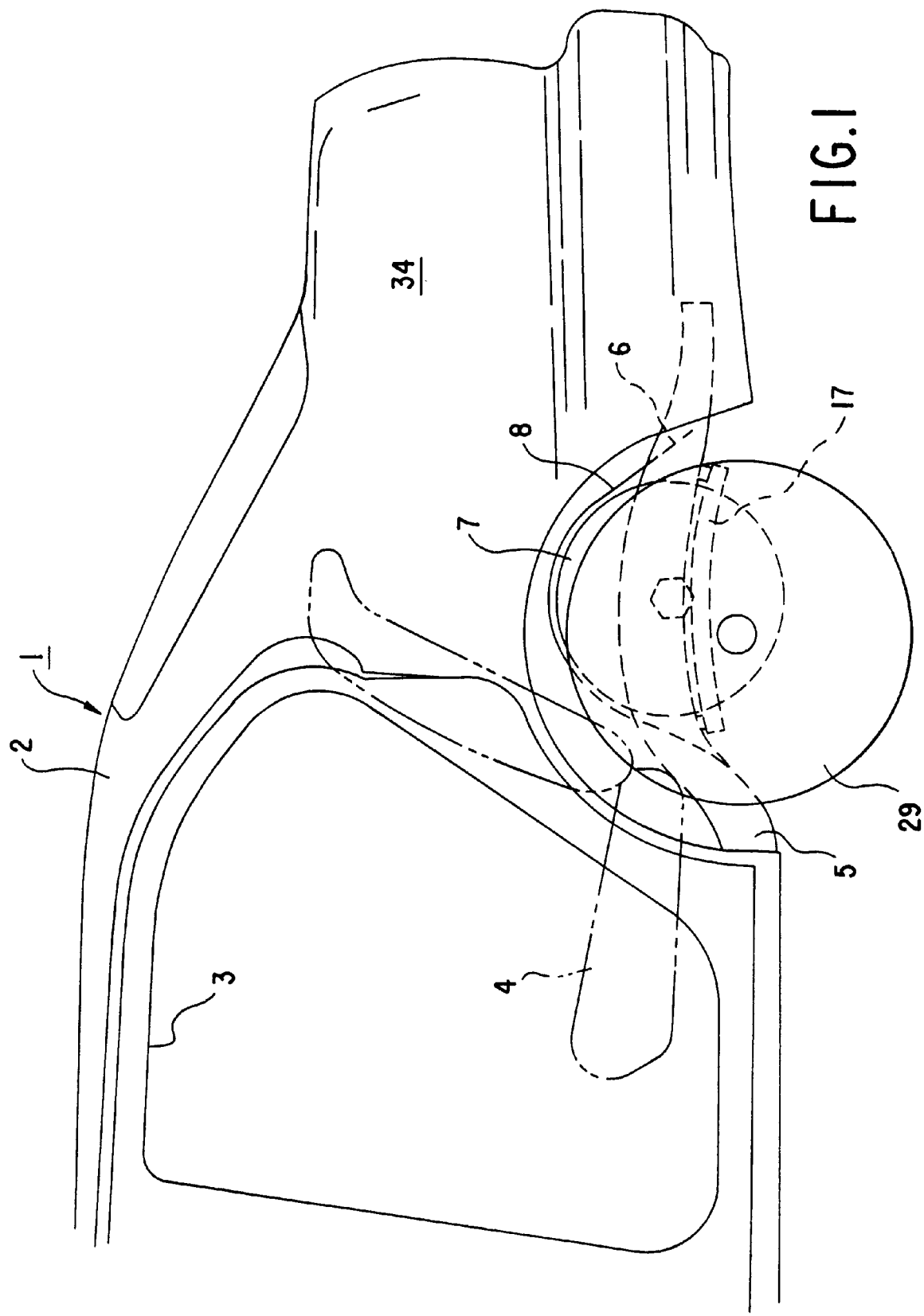
FIG. 1 is a side view showing a preferred embodiment of the pressurized-fuel tank installation structure according to the present invention.
Figure 2:
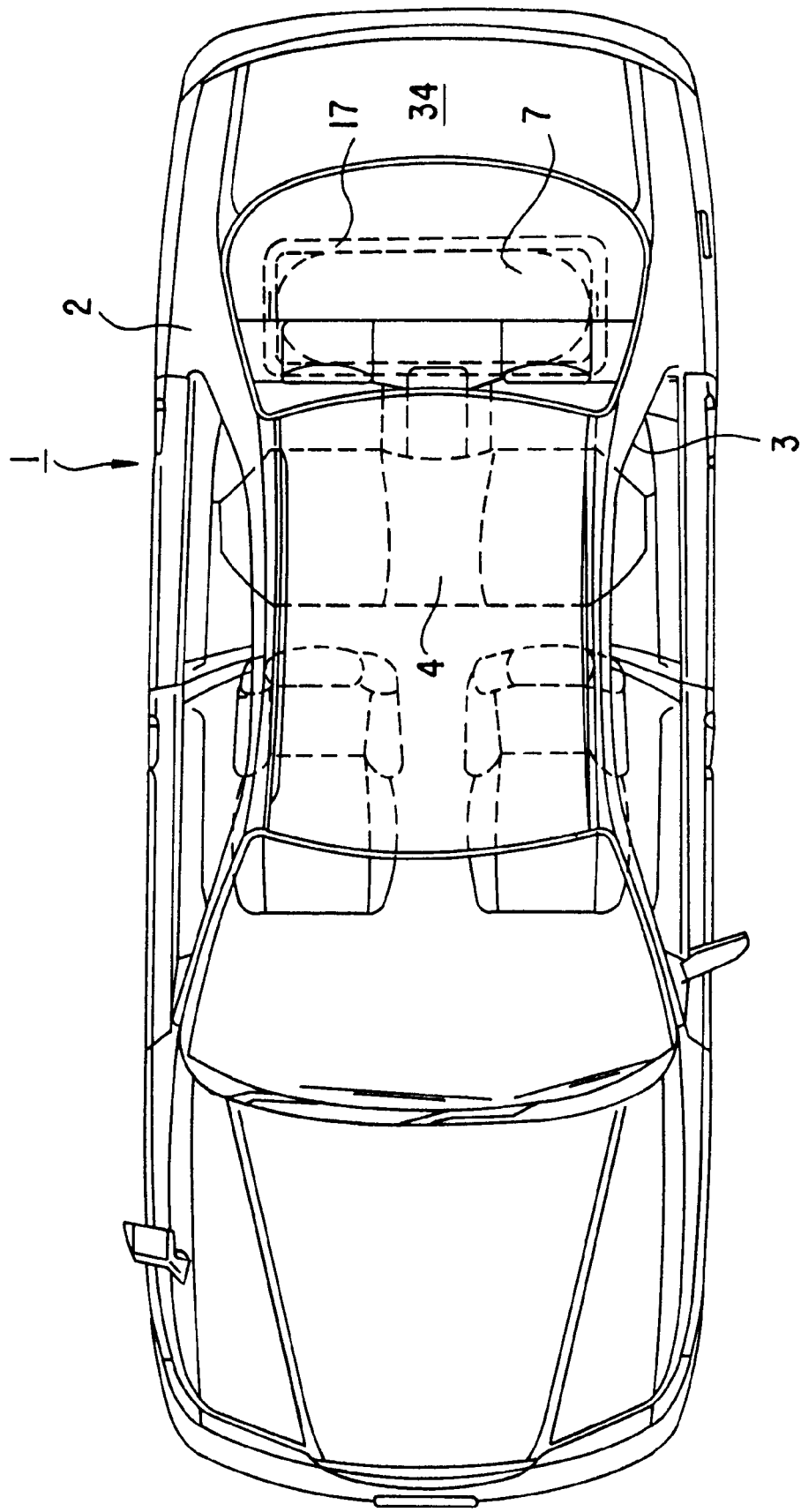
FIG. 2 is an entire plan view thereof.

As shown in FIG. 1, a passenger motorcar 1 is provided with a door opening 3 on a side of a rear car-body 2 in which a rear seat 4 is arranged at a rear portion of the door opening 3. A rear frame 5 extending rearward is bent upward at a lower rear end portion of the door opening 3 and then downward. A floor panel 6 is extended in contact with lower surfaces of the rear frame 5 excepting a portion where the rear frame 5 is bent upward. In the vicinity of the upward bent portion of the rear frame 5, the floor 6 is formed with a hollow 8 hollowed upward, facing downward in other words, adapted to receive an upper half of a steel fuel cylinder 7 to be described after.

The fuel cylinder 7 corresponding to the pressurized-fuel tank of the present invention is formed in a shape like a cocoon having hemispherical shells integrally connected at both ends of a cylindrical shell. At an end of the fuel cylinder 7 is provided a mouth piece 9 in which, though not shown, a fuel charge passage, a fuel supply passage and a relief passage opening into the fuel cylinder 7 respectively are formed in parallel. The fuel charge passage is provided with a charge hand-operated valve 10 and a check valve (not shown) allowing the fuel to flow only toward the fuel cylinder 7, and with an outer end of the fuel charge passage is connected a fuel charge mouth 12 through a fuel charge pipe 11.

The fuel supply passage formed in the mouth piece 9 is provided with a supply electromagnetic valve (not shown), a check valve (not shown) allowing the fuel to flow only outward from interior of the fuel cylinder 7, and a supply hand-operated valve 13, and with an outer end of the fuel supply passage is connected an end of a high pressure fuel supply pipe 14. Another end of the high pressure fuel supply pipe 14 is connected with a pressure regulator unit 15 and a filter 16 is inserted in the high pressure fuel supply pipe 14. The high pressure fuel supply pipe 14, the pressure regulator unit 15 and the filter 16 are integrally fitted to a chassis frame 17 as mentioned in the later part.

The chassis frame 17 is formed so as to surround the periphery of the cocoon-shaped fuel cylinder 7. A pair of right and left fixing belts 18 are wound round the fuel cylinder 7 and fixed to the chassis frame 17 respectively to fit the fuel cylinder 7 to the chassis frame 17. Two attachment holes 19 provided at the four corners of the chassis frame are fitted floating mounts 20 with rubber bushes for attaching the chassis frame 17 to a lower surface of the rear frame 5 floatingly through the floating mount 20.

On both right and left sides of the chassis frame 17 are respectively projected upper and lower pivoting sections 21, 22 to which inner ends of upper and lower arms 23, 24 are respectively pivoted swingably up and down. Outer ends of the upper arm 23 and the lower arm 24 are pivoted to a knuckle 25 swingably up and down.

A trailing arm 26 extends forward from the knuckle 25, and a front end portion of the trailing arm 26 is attached to the rear car-body 2 through a bush 27. To an axle 28 projected outward from the knuckle 25 is pivoted a rear wheel 29 rotatably.

A lower end of a damper 31 with a coil spring 30 wound round the periphery is pivoted to an upper end of the knuckle 25. An upper end of the damper 31 is attached to an upper portion of a not shown rear wheel housing of the rear car-body 2.

An internal combustion engine 32 arranged in a front part of the motorcar 1 and the pressure regulator unit 15 are connected with each other by a flexible low pressure fuel supply pipe 33.

Figure 3:
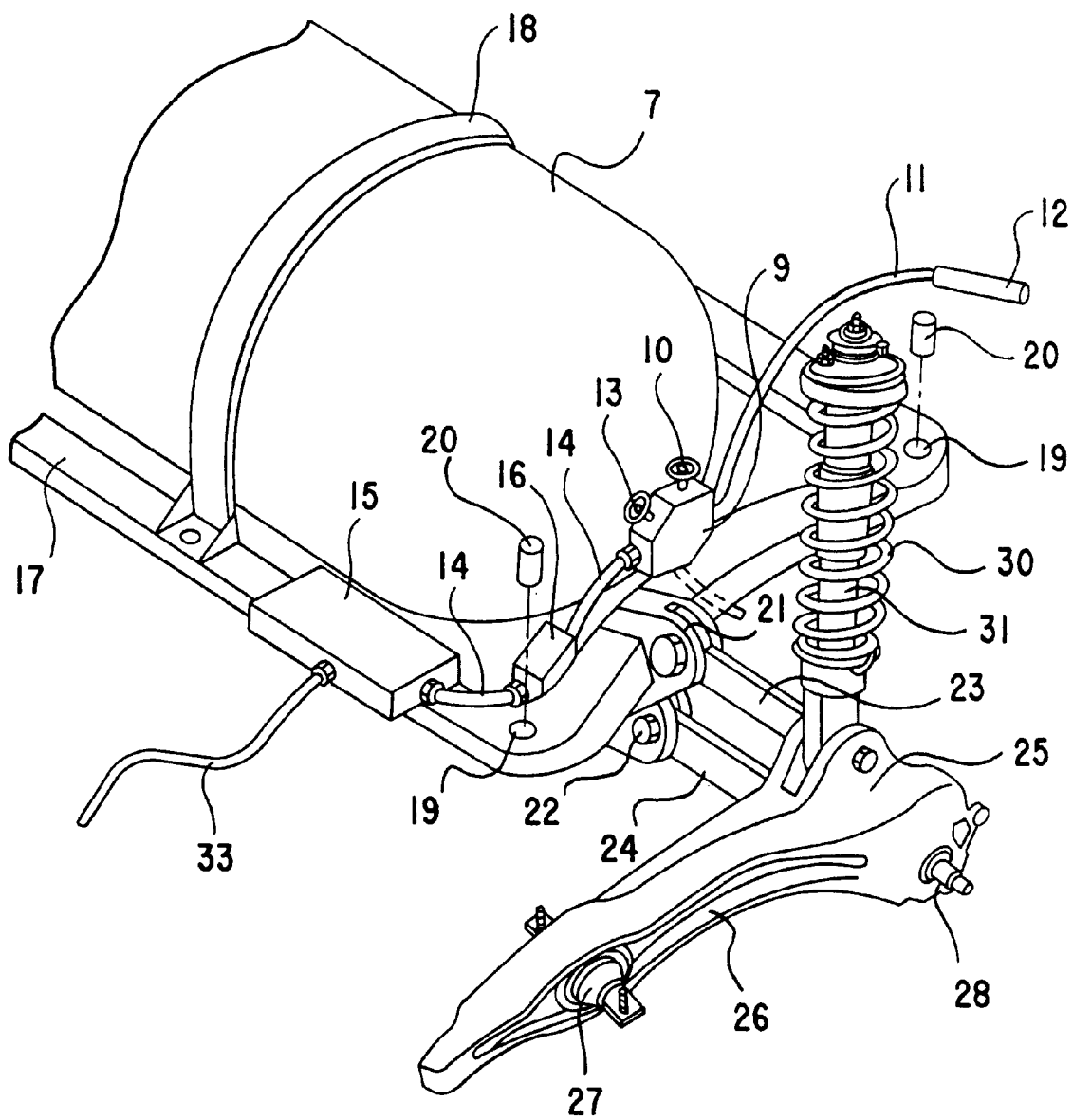
FIG. 3 is a perspective view of an essential part thereof.
Figure 4:
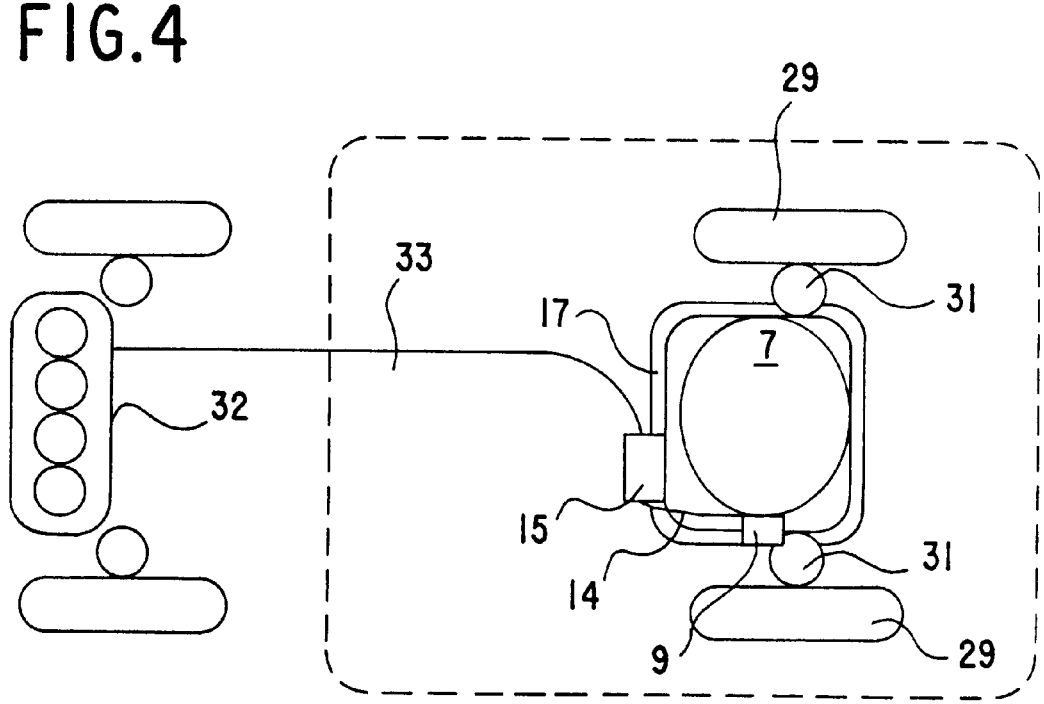
FIG. 4 is an explanatory illustration of the preferred embodiment.

In the aforementioned embodiment of FIGS. 1 to 4, as shown in FIG. 3, to the chassis frame 17 are fitted the pressure regulator unit 15, the filter 16 and the high pressure fuel supply pipe 14 besides the fuel cylinder 7 and further the knuckle 25 is attached to the chassis frame 17 by means of the upper arm 23 and the lower arm 24, therefore, only by attaching the chassis frame 17 to the rear frame 5 through the floating mount 20 with the upper half of the fuel cylinder 7 put in the hollow 8 of the floor panel 6 from the bottom, the fuel supply system and the rear suspension can be attached to the rear frame 5 very easily and productivity can be improved remarkably.

Since all piping works of the fuel supply system can be carried out at a spacious outside of the car-room before the chassis frame 17 is combined with the motorcar 1, the piping works of the fuel system can be performed efficiently and surely, and a pipe leakage inspection also can be performed easily so that the pipe leakage can be prevented surely.

Since the fuel cylinder 7 is arranged under the floor panel 6 rather than within the trunk room 34, a seal structure for preventing leakage of the fuel is unnecessary and the construction is simplified greatly. In addition, since the fuel cylinder 7 does not exist in the trunk room 34, even if a part of the floor panel 6 swells up to narrow the trunk room 34, there is no dead space formed in the trunk room and therefore space efficiency of the trunk room is high.

Installation position of the heavy fuel cylinder 7 is shifted downward, so that center of gravity of the car-body lowers and steering stability is improved easily.

Pressure of the pressurized-fuel supplied from the fuel cylinder 7 is reduced by the pressure regulator unit 15 integrally fitted to the chassis frame 17 together with the fuel cylinder 7, therefore, the pressure regulator unit 15 can be connected with the internal combustion engine 32 by the flexible low pressure fuel supply pipe 33 and further the chassis frame 17 can be supported floatingly by attaching the chassis frame 17 to the rear frame 5 through the floating mount 20 so that an improved ride is attained.

Figure 5:
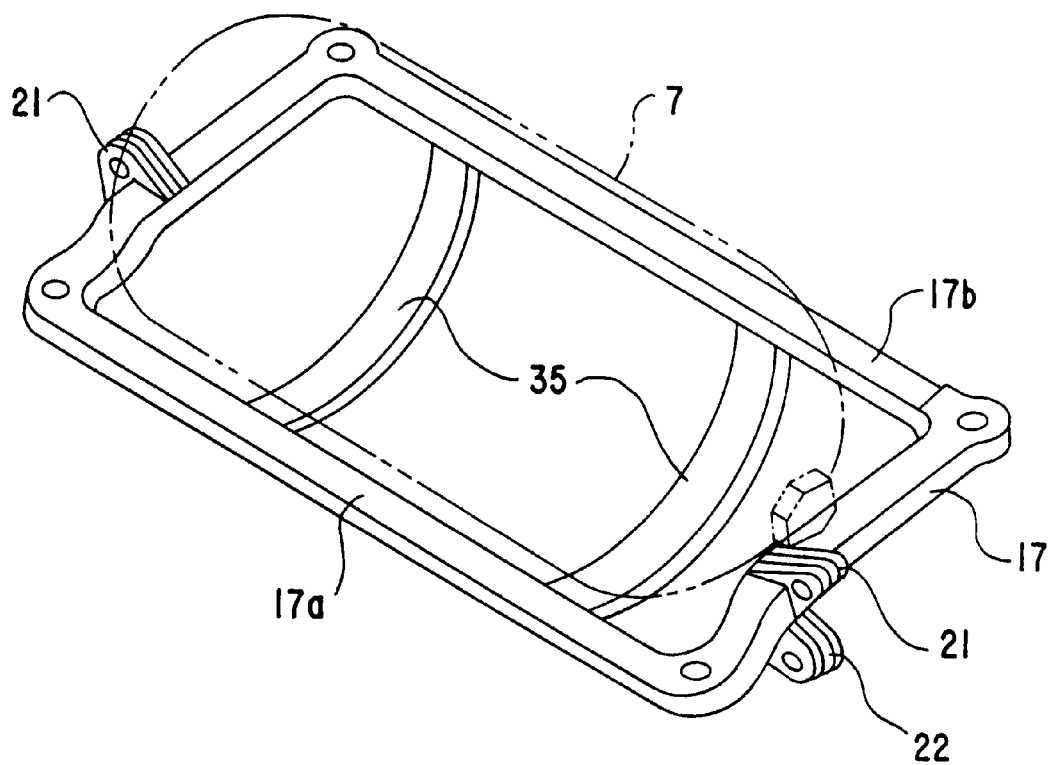
FIG. 5 is a perspective view of an essential part of another preferred embodiment.

In the embodiment shown in FIGS. 1 to 4, the fuel cylinder 7 is fitted integrally to the chassis frame 17 by means of the fixing belt 18. On the other hand, in another embodiment shown in FIG. 5, the chassis frame 17 has right and left semicircular arc-shaped supporting members 35 formed integrally between front and rear sections 17a, 17b and the fuel cylinder 7 placed on the supporting members 35 is fixed from the top by the fixing belt 18, so that the fuel cylinder 7 can be fixed to the chassis frame 17 more strongly.

The pressurized-fuel tank may be formed in a shape having required pressure-resistance other than the cocoon shape of the aforementioned fuel cylinder 7 such as a doughnut shape like that of a tire.

What is claimed is:

1. A pressurized-fuel tank installation structure in a motorcar having an internal combustion engine mounted in a front part of a car-body and a pressurized-fuel tank for supplying a fuel to said internal combustion engine, comprising:

a chassis frame in the form of a frame-shape for surrounding and supporting said pressurized-fuel tank and attached to a lower surface of the car-body under a floor panel, said pressurized-fuel tank being positioned in said frame-shape and attached to said chassis frame integrally;

a pressure regulator attached to said chassis frame, said pressure regulator being connected with said pressurized-fuel tank by a pressurized-fuel pipe, a rear wheel suspension provided on said chassis frame; and a pipe arranged along a lower surface of said floor panel and connecting said pressure regulator and said internal combustion engine with each other.

2. A pressurized-fuel tank installation structure in a motorcar as claimed in claim 1, wherein said pressurized-fuel tank is in the form of a cylinder having hemispherical ends and a longitudinal center line of said tank is directed in a direction of a width of the motorcar.

3. A pressurized-fuel tank installation structure in a motorcar as claimed in claim 2, wherein said floor panel has an upwardly hollowed portion adapted to receive an upper half of said cylindrical pressurized-fuel tank attached to said chassis frame.

4. A pressurized-fuel tank installation structure in a motorcar as claimed in claim 1, wherein said chassis frame is attached to said car-body through a buffer means.

5. A pressurized-fuel tank installation structure in a motorcar as claimed in claim 4, wherein said buffer means is a rubber mount.

6. A pressurized-fuel tank installation structure in a motorcar as claimed in claim 1, wherein said pipe connecting said pressure regulator and said internal combustion engine with each other is a low pressure flexible pipe.

* * * * *